United States Patent Office 3,363,428
Patented Jan. 16, 1968

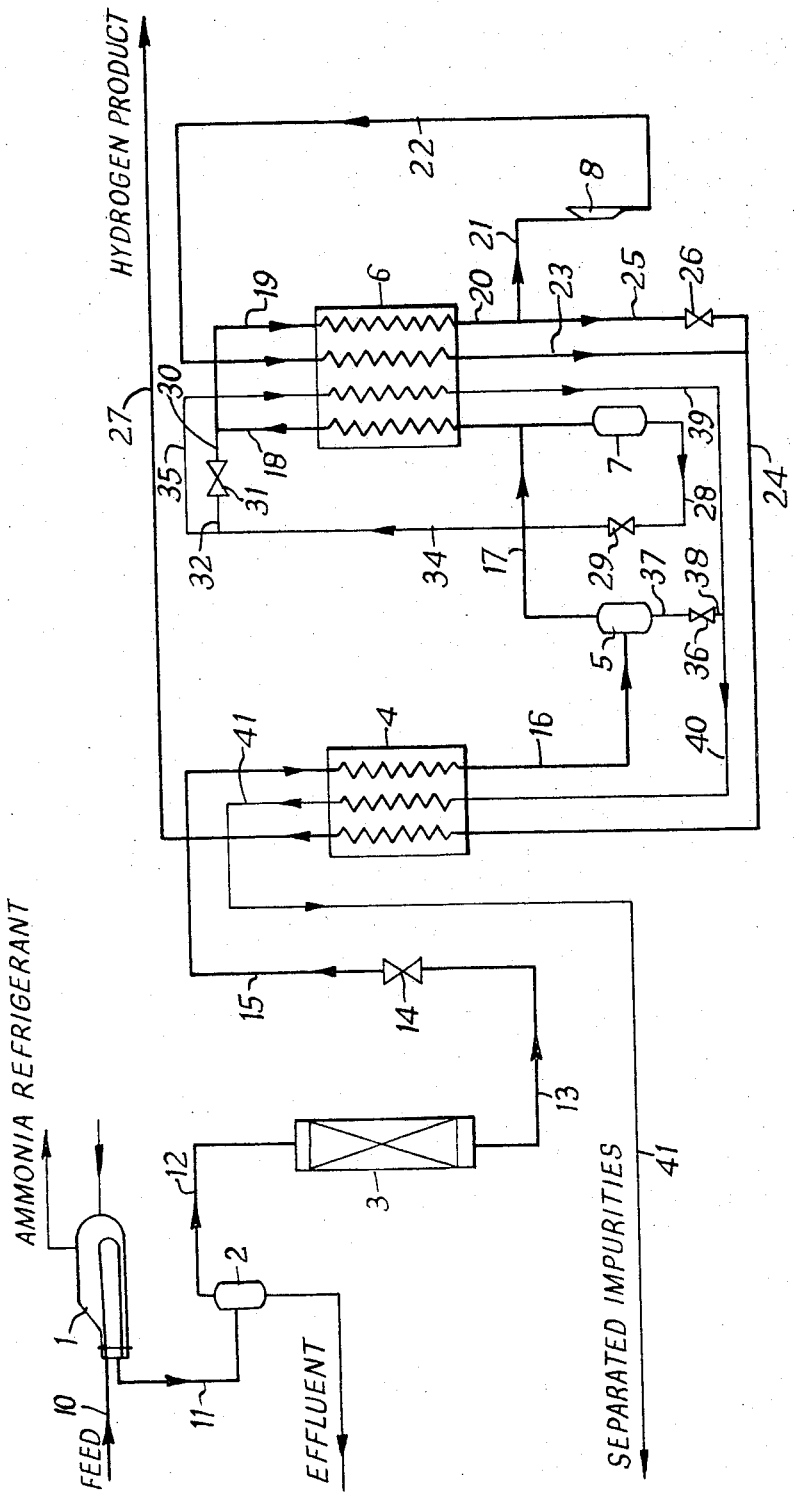

3,363,428
HYDROGEN RECOVERY WITH CONDENSATE
WASH IN HEAT EXCHANGER PATH
Paul L. Charlesworth, Huddersfield, England, assignor to
Petrocarbon Developments Limited, London, England
Filed Dec. 6, 1965, Ser. No. 511,695
Claims priority, application Great Britain, Dec. 17, 1964,
51,365/64
19 Claims. (Cl. 62—23)

This invention relates to the recovery of a hydrogen concentrate from a gaseous mixture containing hydrogen as its main component by volume and containing one or more higher boiling inorganic gases, e.g. nitrogen, argon and carbon monoxide, which can be separated from hydrogen by condensation at low temperatures. The gaseous mixture may also contain one or more hydrocarbon gases, e.g. methane.

It is known that in the synthesis of ammonia from nitrogen and hydrogen, inert impurities such as argon and methane present in the feed gas tend to accumulate in the synthesis reactor thereby having a detrimental effect on the reaction. To avoid this accumulation it is necessary to remove continuously these impurities in a purge stream which contains in addition to the argon and methane high concentrations of hydrogen and nitrogen. This invention provides a process of recovering the hydrogen at low cost in a concentrated from suitable for returning to the ammonia synthesis plant or for use in any other way.

The process of this invention is also applicable to the recovery of hydrogen in concentrated form from other gaseous mixtures containing hydrogen and inorganic gases which may be separated from the hydrogen by low temperature condensation, e.g. reformer gases.

According to the present invention a process for the recovery of a hydrogen concentrate from a gaseous mixture of the kind referred to above comprises the steps of
(a) cooling the gaseous mixture at the elevated pressure by passing it through at least two heat exchangers with the condensation of components other than hydrogen taking place in at least the final two heat exchangers, the partially concentrated hydrogen from the last but one heat exchanger being passed upwardly through the final heat exchanger with condensate formed therein flowing downwards in contact with the rising stream
(b) separating the condensed liquid fraction after each heat exchanger in which condensation takes place
(c) passing the hydrogen concentrate leaving the top of the final heat exchanger downwardly through the final heat exchanger in indirect heat exchange with the partially concentrated hydrogen passing upwardly therethrough
(d) expanding at least one part of the hydrogen concentrate leaving the lower end of the final heat exchanger with the performance of external work to produce refrigeration for use in the process
(e) returning the expanded hydrogen concentrate through all the heat exchangers countercurrent to and in indirect heat exchange with the incoming gaseous mixture
(f) returning the residual hydrogen concentrate, if any, through all the heat exchangers other than the final heat exchanger countercurrent to and in indirect heat exchange with the incoming gaseous mixture
(g) expanding the liquified condensate from each exchanger and returning each expanded liquid condensate through the heat exchanger in which it was formed and through the preceding heat exchangers in countercurrent to and in indirect heat exchange with the incoming gaseous mixture, the condensates being evaporated and warmed up in their passage through the heat exchangers.

The process of the invention may advantageously be applied to gaseous mixtures which are available at elevated pressure of 15 atmospheres and above, e.g. ammonia synthesis purge gases.

It is preferred to effect the cooling of the gaseous mixture and condensation of higher boiling gases at a pressure of between 30 and 50 atmospheres absolute. If the gaseous mixture is available at a pressure higher than 50 atmospheres, it may be expanded to the preferred pressure either before it enters the process or at an intermediate stage in the cooling prior to condensation of the higher boiling gases taking place.

When operating at pressures in excess of 15 atmospheres, e.g. at pressures of 30 to 50 atmospheres, the expansion of the hydrogen concentrate may take place to an intermediate elevated pressure and the hydrogen concentrate recovered at this intermediate elevated pressure.

In the final heat exchange zone of the process of the invention the condensing gases pass downwardly as reflux in countercurrent flow and direct contact with the partially concentrated gaseous mixture before separation of condensate from the resulting hydrogen concentrate. This reflux action assists in purifying the hydrogen and in the case of ammonia synthesis purge gas reduces to a minimum the argon content of the hydrogen concentrate.

When only a part of the hydrogen concentrate is expanded with the performance of external work the residual hydrogen concentrate may be expanded through an expansion valve to the same pressure and the two expanded hydrogen concentrate streams combined prior to being passed through the last but one heat exchanger and any preceding heat exchangers. The expansion with performance of external work preferably takes place through an expansion turbine.

The expanded liquid condensate which has been passed through one heat exchanger and partially warmed up is preferably combined with the expanded liquid condensate from the next preceding heat exchanger before passage through the latter.

Preferably also a small portion of the hydrogen concentrate is expanded to the same pressure as that to which the liquid condensates are expanded and is introduced into the expanded liquid condensate from the final heat exchanger, thereby lowering the evaporation temperature of the liquid condensate.

The liquid condensates may suitably be expanded to a pressure close to atmospheric pressure.

One embodiment of the invention, as applied to the recovery of a hydrogen concentrate from ammonia synthesis purge gas, is described below with reference to the accompanying drawing, in which 1 is a preliminary refrigeration system, 2 is a liquid/gas separator, 3 is a drier, 4 and 6 are heat exchangers, 5 and 7 are liquid/gas separators and 8 is an expansion turbine.

The purge gas at 135 atmospheres pressure is fed through line 10 to the refrigeration system 1, in which it is cooled with the aid of an ammonia refrigerant to a temperature of from 275 to 279° K. The cooled gas containing condensed water is passed via line 11 to separator 2 in which the water is separated and thence via line 12 to drier 3, in which drying is completed. The dried gas is then passed via line 13, expansion valve 14, through which it is expanded to 40 atmospheres absolute pressure, and line 15 to heat exchanger 4. In passing through heat exchanger 4, the gas is cooled to a temperature of 85° K., so that the greater part of the methane and argon and some of the nitrogen condense. The partially concentrated gaseous mixture and the condensed liquid fraction are passed via line 16 to separator 5, in which the liquid fraction is separated. The residual gaseous mixture is then passed via line 17 to heat exchanger 6 through which it passes upwardly and in which it is further cooled to 65° K., i.e., just above the freezing point of nitrogen, with the result that argon and nitrogen condense and descend the heat exchanger as reflux in contact with the rising gas. The condensate is collected in separator 7 below the heat exchanger 6 and the hydrogen concentrate leaves the top of the heat exchanger 6 at a temperature of 65° K. by line 18. The hydrogen concentrate is then passed via line 19 downwardly through heat exchanger 6 in indirect heat exchange with the partially concentrated hydrogen passing upwardly through the same heat exchanger, thus assisting in cooling the latter and becoming warmed up to 83° K. in the process. The hydrogen concentrate leaves heat exchanger 6 via line 20 and is then divided into two streams, one of which is passed via line 21 through the expansion turbine 8, in passing through which it is expanded to 25 atmospheres absolute and is cooled to 64° K. The expanded and cooled hydrogen concentrate is then passed by line 22 to the top of the heat exchanger 6 and downwardly therethrough to assist in cooling by indirect heat exchange the gas passing upwardly through heat exchanger 6. The hydrogen concentrate is then passed via lines 23 and 24 back through the heat exchanger 4, being joined in line 24 by the other part of the hydrogen concentrate passing through line 25 and expansion valve 26 through which it is expanded to 25 atmospheres absolute. The combined stream of hydrogen concentrate entering heat exchanger 4 at a temperature of 83° K. and leaving at a temperature of 273° K. cools by indirect heat exchange the incoming gaseous mixture and then passes through line 27 to be collected as product under a pressure of about 25 atmospheres absolute.

The condensate from separator 7 is passed through line 28, expansion valve 29, through which it is expanded to close to 1 atmosphere absolute, and then via lines 34 and 35 to the top of heat exchanger 6 through which it passes downwardly and evaporates to assist in cooling the rising gas by indirect heat exchange. In accordance with a feature of the invention a small quantity of hydrogen concentrate at 25 atmospheres absolute is diverted from line 18 through line 30, expansion valve 31 and line 32 to join the expanded condensate in line 34. This has the effect of reducing the partial vapour pressure of the vapourizing condensate and thereby reduces the temperature range at which it evaporates, which results in the refrigeration being made available at a lower temperature in heat exchanger 6.

The condensate from separator 5 is likewise expanded to close to atmospheric pressure through valve 36, to which it is passed by line 37, and is then passed by line 38 to join the evaporated condensate leaving heat exchanger 6 via line 39 and the combined stream is passed via line 40 to heat exchanger 4, through which it passes with evaporation of liquid present to assist in cooling by indirect heat exchange the incoming gaseous mixture, leaving the heat exchanger 4 by line 41 to be discarded as waste.

The product hydrogen concentrate may be obtained with a hydrogen content of about 98% by volume by the process.

Though in the embodiment described above the two hydrogen concentrate streams are combined after expansion, the stream which is not expanded in the turbine (i.e., stream 25 in the drawing) may be returned as a separate stream through the heat exchanger or heat exchangers preceding the final heat exchanger and collected as a separate stream at a higher pressure than the other stream which is expanded through the turbine.

I claim:

1. A process for the recovery of a hydrogen concentrate from a dried gaseous mixture at an elevated pressure containing hydrogen as its main component by volume and containing one or more higher boiling inorganic gases which can be separated from hydrogen by condensation at low temperatures, which process comprises the steps of
    (a) cooling the gaseous mixture at the elevated pressure by passing it through at least two heat exchangers with the condensation of components other than hydrogen taking place in at least the final two heat exchangers, a partially concentrated hydrogen leaving the next to the last heat exchanger being passed upwardly through the final heat exchanger with condensate formed therein flowing downwards in contact with the rising stream and a hydrogen concentrate leaving the top of the final heat exchanger
    (b) separating the condensed liquid fraction after each heat exchanger in which condensation takes place
    (c) passing the hydrogen concentrate leaving the top of the final heat exchanger downwardly through a separate path in the final heat exchanger in indirect heat exchange with the partially concentrated hydrogen passing upwardly therethrough
    (d) expanding at least a part of the hydrogen concentrate leaving the lower end of the final heat exchanger with the performance of external work to produce refrigeration for use in the process
    (e) returning the expanded at least part of the hydrogen concentrate through all the heat exchangers countercurrent to and in indirect heat exchange with the incoming gaseous mixture
    (f) returning any remaining portion of hydrogen concentrate through all the heat exchangers other than the final heat exchanger countercurrent to and in indirect heat exchange with the incoming gaseous mixture
    (g) expanding the liquefied condensate from each heat exchanger and returning each expanded liquid condensate through the heat exchanger in which it was formed and through the preceding heat exchangers in countercurrent to and in indirect heat exchange with the incoming gaseous mixture, the condensates being evaporated and warmed up in their passage through the heat exchangers.

2. A process as claimed in claim 1, in which the hydrogen concentrate which is expanded with the performance of external work is expanded through an expansion turbine.

3. A process as claimed in claim 1, in which the expanded liquid condensate which has been passed through one heat exchanger and partially warmed up, is combined with the expanded liquid condensate from the next preceding heat exchanger, before passage through the latter.

4. A process as claimed in claim 1, in which a small portion of the hydrogen concentrate is expanded to the same pressure as that to which the liquid condensates are expanded and is introduced into the expanded liquid condensate from the final heat exchanger, thereby lowering the evaporation temperature of the liquid condensate.

5. A process as claimed in claim 1, in which the liquid condensates are expanded to a pressure close to atmospheric pressure.

6. A process as claimed in claim 1, in which the said higher boiling inorganic gases are selected from the groups consisting of nitrogen, argon and carbon monoxide.

7. A process as claimed in claim 1, in which the said gaseous mixture also contains a hydrocarbon gas.

8. A process as claimed in claim 1, in which the said gaseous mixture is an ammonia synthesis purge gas and the hydrogen concentrate produced contains up to 98% by volume of hydrogen.

9. A process as claimed in claim 1, in which the said any remaining portion of hydrogen concentrate is expanded through an expansion valve to the same pressure as that to which the other part of the hydrogen concentrate is expanded with the performance of external work and the two expanded streams are combined prior to their being passed through the next to the last but one heat exchanger and any preceding heat exchangers.

10. A process as claimed in claim 9, in which the hydrogen concentrate which is expanded with the performance of external work is expanded through an expansion turbine.

11. A process as claimed in claim 1, in which the said elevated pressure is at least 15 atmospheres absolute.

12. A process as claimed in claim 11, in which the elevated pressure is from 30 to 50 atmospheres absolute.

13. A process as claimed in claim 12, in which that part of the hydrogen concentrate expanded with the performance of external work is expanded to a pressure intermediate said elevated pressure and atmospheric and is recovered at substantially said intermediate pressure.

14. A process as claimed in claim 13, in which the any remaining portion of hydrogen concentrate is recovered at substantially said elevated pressure.

15. A process for the recovery of a hydrogen concentrate from an ammonia synthesis purge gas mixture at an elevated pressure of from about 30 to about 50 atmospheres, which process comprises the steps of
  (a) cooling the gas mixture at the elevated pressure by passing it through two heat exchangers with the condensation of components other than hydrogen taking place in each heat exchanger, a partially concentrated hydrogen to the final heat exchanger being passed upwardly through the final heat exchanger with condensate formed therein flowing downwards in contact with the rising stream and a hydrogen concentrate leaving the top of the final heat exchanger
  (b) separating the condensed liquid fraction after each heat exchanger
  (c) passing the hydrogen concentrate leaving the top of the final heat exchanger downwardly through the final heat exchanger in a separate path in indirect heat exchange with the partially concentrated hydrogen passing upwardly therethrough
  (d) expanding at least a part of the hydrogen concentrate leaving the lower end of the final heat exchanger with the performance of external work to produce refrigeration for use in the process
  (e) returning the expanded at least a part of the hydrogen concentrate through both the heat exchangers countercurrent to and in indirect heat exchange with the incoming gas mixture
  (f) returning any remaining portion of hydrogen concentrate through the first heat exchanger countercurrent to and in indirect heat exchange with the incoming gas mixture
  (g) expanding the liquefied condensate from each heat exchanger and returning each expanded liquid condensate through the heat exchanger in which it was formed and, in the case of the liquid condensate from the final heat exchanger, also through the first heat exchanger, in countercurrent to and in indirect heat exchange with the incoming gas mixture, the condensates being evaporated and warmed up in their passage through the heat exchangers.

16. A process as claimed in claim 15, in which a small portion of the hydrogen concentrate is expanded to the same pressure as that to which the liquid condensates are expanded and is introduced into the expanded liquid condensate from the final heat exchanger, thereby lowering the evaporation temperature of the liquid condensate.

17. A process as claimed in claim 15, in which that part of the hydrogen concentrate expanded with the performance of external work is expanded to a pressure intermediate said elevated pressure and atmospheric pressure and is recovered at substantially said intermediate pressure.

18. A process as claimed in claim 17, in which the expansion with the performance of external work takes place through an expansion turbine.

19. A process as claimed in claim 17, in which the said any remaining portion of hydrogen concentrate is expanded through an expansion valve to the same pressure as that which the other part of the hydrogen concentrate is expanded and the two expanded streams are combined prior to their being passed through the first heat exchanger.

References Cited

UNITED STATES PATENTS

| | | | |
|---|---|---|---|
| 2,495,549 | 1/1950 | Roberts | 62—39 XR |
| 2,591,658 | 4/1952 | Haringhuizen | 62—23 |
| 2,936,593 | 5/1960 | Grunberg. | |
| 3,026,682 | 3/1962 | Palazzo et al. | |
| 3,062,015 | 11/1962 | Cost | 62—23 XR |
| 3,224,211 | 12/1965 | Karbosky | 62—23 |

WILBUR L. BASCOMB, Jr., *Primary Examiner.*

V. W. PRETKA, *Assistant Examiner.*